United States Patent [19]

Mobin

[11] Patent Number: 5,748,680
[45] Date of Patent: May 5, 1998

[54] COARSE FREQUENCY BURST DETECTOR FOR A WIRELINE COMMUNICATIONS SYSTEM

[75] Inventor: Mohammad Shafiul Mobin, Whitehall, Pa.

[73] Assignee: Lucent Technologies Inc., Murray Hill, N.J.

[21] Appl. No.: 357,804

[22] Filed: Dec. 16, 1994

[51] Int. Cl.$^6$ .............................. H04L 25/06; H04L 25/10
[52] U.S. Cl. .................... 375/317; 375/326; 375/340; 375/350; 375/364
[58] Field of Search .......................... 375/257, 317, 375/340, 350, 231, 236, 364, 355, 327, 324, 326, 316; 329/304, 308

[56] References Cited

U.S. PATENT DOCUMENTS

| | | | |
|---|---|---|---|
| 3,778,550 | 12/1973 | David et al. | 178/69.5 R |
| 4,712,222 | 12/1987 | Heard et al. | 375/77 |
| 4,794,341 | 12/1988 | Barton et al. | 329/50 |
| 4,835,792 | 5/1989 | Davarian | 375/80 |
| 4,939,516 | 7/1990 | Early | 341/143 |
| 5,007,068 | 4/1991 | Simon et al. | 375/53 |
| 5,093,846 | 3/1992 | Walton, Jr. et al. | 375/343 |
| 5,127,025 | 6/1992 | Okanoue | 375/347 |
| 5,170,415 | 12/1992 | Yoshida et al. | 375/326 |
| 5,230,011 | 7/1993 | Gielis et al. | 375/97 |
| 5,241,688 | 8/1993 | Arora | 375/344 |
| 5,377,224 | 12/1994 | Hudson | 375/200 |
| 5,379,223 | 1/1995 | Asplund | 375/327 |
| 5,400,363 | 3/1995 | Waugh et al. | 375/80 |
| 5,416,800 | 5/1995 | Frank | 375/316 |
| 5,432,818 | 7/1995 | Lou | 375/355 |
| 5,507,037 | 4/1996 | Bartkowiak et al. | 455/296 |
| 5,524,120 | 6/1996 | Pride, III et al. | 375/355 |
| 5,550,868 | 8/1996 | Boccuzzi | 375/330 |
| 5,574,399 | 11/1996 | Oura et al. | 329/306 |
| 5,621,766 | 4/1997 | Bakke et al. | 375/340 |

OTHER PUBLICATIONS

Spring Joint Computer Conference, 1971, "A Unified Algorithm for Elementary Functions," J.S. Walther, Hewlett-Packard Co., Palo Alto, CA pp. 379–385.

IRE Transactions Electronic Computers, "The Cordic Trigonometric Computing Technique," J. E. Volder, Sep. 1959, pp. 330–334.

IEEE Signal Processing Magazine, "CORDIC-Based VLSI Architectures for Digital Signal Processing,", Yu Hen Hu, Jul. 1992, pp. 16–35.

Phoenix Conference on Computers and Communications, 1991 Conference Proceedings, Mar. 27–30, 1991, Scottsdale, AZ, "Signal Processing Aspects of Motorola's Pan-European Digital Cellular Validation Mobile," David E. Borth and Philip D. Rasky, pp. 416–423.

*Primary Examiner*—Don N. Vo
*Attorney, Agent, or Firm*—John P. Veschi; Howard A. Skaist

[57] ABSTRACT

Briefly, in accordance with one embodiment of the invention, a coarse frequency burst detector for use at the receiving end of a wireline communications system comprises: a digital signal filter adapted to filter a component of decoded signal samples, the decoded signal samples being derived from a baseband signal transmitted via the wireline communications system; and a threshold detector adapted to threshold the signal level of the filtered component of the decoded signal samples with respect to a substantially predetermined level. In accordance with another embodiment, a method of detecting at the receiving end of a wireline communications system a frequency burst in a baseband signal transmitted via the wireline communications system comprises the steps of: filtering a component of a decoded signal derived from the baseband signal transmitted via the wireline communications system; and thresholding the filtered component.

9 Claims, 6 Drawing Sheets

FB: FREQUENCY BURST

0: COUNTER CLOCKWISE 90° ROTATION

1: CLOCKWISE 90° ROTATION

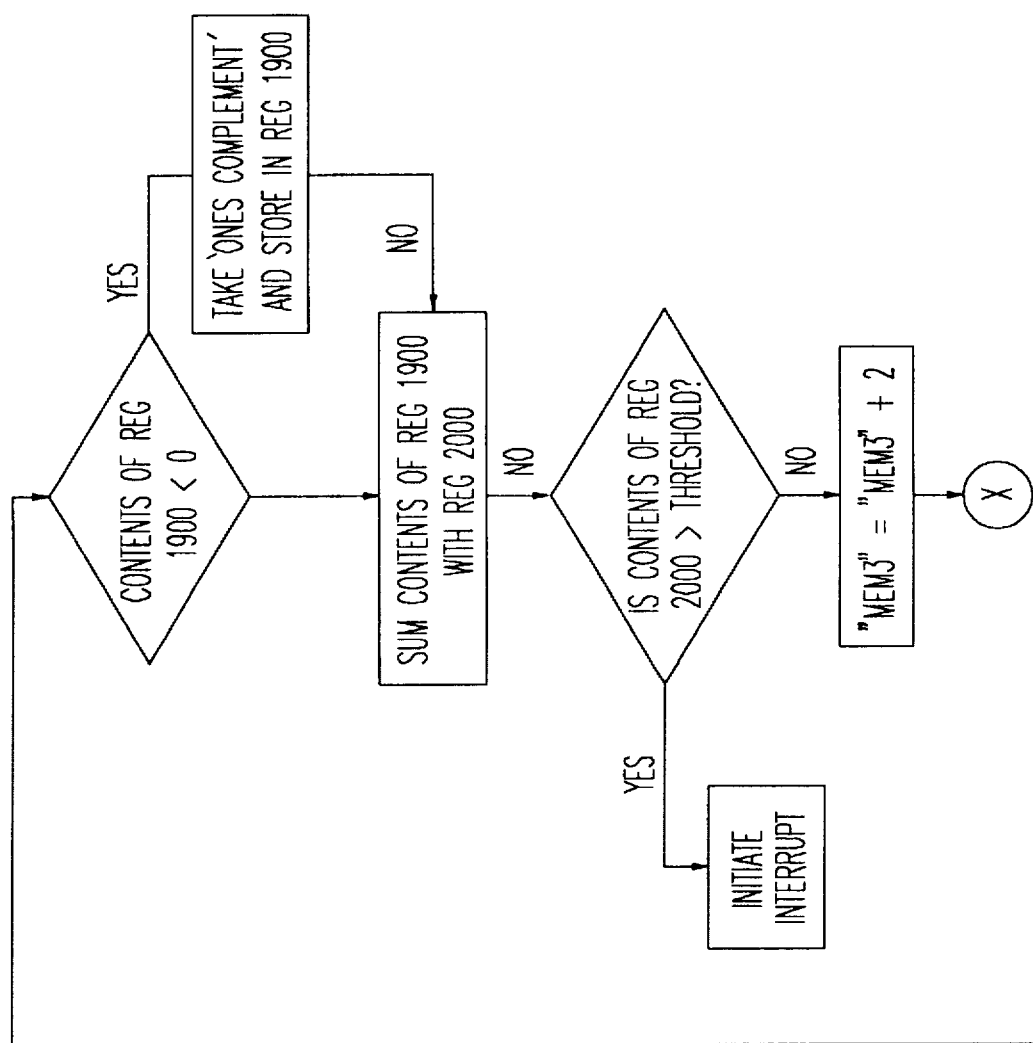
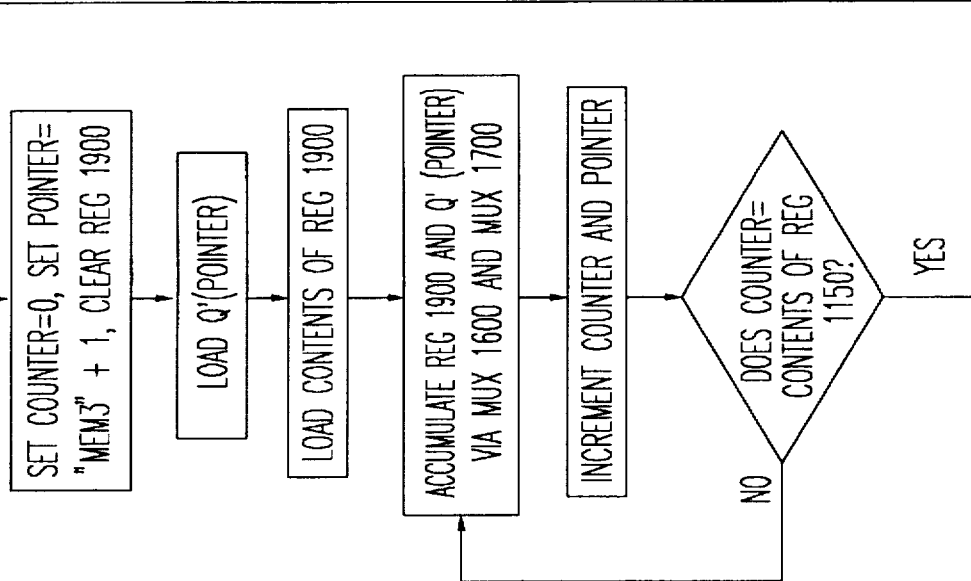
FIG. 9

५,७४८,६८०

COARSE FREQUENCY BURST DETECTOR FOR A WIRELINE COMMUNICATIONS SYSTEM

CROSS-REFERENCE TO RELATED APPLICATIONS

This patent application is being filed concurrently with patent application Ser. No. 08/356,998 entitled "Coarse Frequency Burst Detector for a Wireless Communications System, Such as For Use With GSM" (Mobin 15) by M. S. Mobin, filed Dec. 16, 1994, patent application Ser. No. 08/357,802 entitled "Oscillator Frequency Offset Error Estimator for a Wireline Communications System," (Mobin 17) by M. S. Mobin, filed Dec. 16, 1994 and patent application Ser. No. 08/357,005 entitled "Oscillator Frequency Offset Error Estimator for a Wireless Communications System, Such as For Use With GSM" (Mobin 14), by M. S. Mobin, filed Dec. 16, 1994, all of the foregoing assigned to the assignee of the present invention and herein incorporated by reference.

TECHNICAL FIELD

The present invention relates to communications and, more particularly, to wireline communications systems.

BACKGROUND OF THE INVENTION

A number of well-known communication signaling techniques are used throughout the world, one example being gaussian minimum phase shift keying (GMSK). One advantage of this form of phase modulation is to permit a constant amplitude modulator to be employed. Thus, non-linear carrier frequency power amplifiers may be employed in a communications system utilizing this phase modulation technique.

One common problem in a communications system that employs GMSK is frequency detection. One reason is because typically oscillators employed in either the transmitter or receiver are non-ideal due to cost considerations, circuit complexity considerations and for other reasons. Thus, it may be difficult in such communication systems to "lock" onto the proper carrier frequency necessary for the communications system to operate satisfactorily. One approach that may be employed includes transmitting a frequency burst of a known signal that may be employed at the receiving end of the communications system for frequency correction. In a digital system, one such frequency correction burst may comprise a successive number of digital samples, such as either a successive number of "ones" or a successive number of "zeros." However, even this approach provides a disadvantage. For example, in order to "lock" onto the frequency associated with such a predetermined frequency correction burst, exhaustive matched filtering is typically employed, such as described, for example, in "Signal Processing Aspects of Motorola's Pan-European Digital Cellular Validation Mobile," by David Borth and Phillip Raskey, published in the 1991 Conference Proceedings of the Phoenix Conference on Computers and Communications held in Scarsdale, Ariz., on Mar. 27–30, 1991, herein incorporated by reference. Applying matched filtering in this context has disadvantages in that it is time consuming, may consume significant power and may bottleneck computing resources in an environment often having limited computational capability, such as with a conventional receiver. A need therefore exists for a technique to perform frequency burst detection for a signal transmitted over a wireline communications system that is either less time consuming, consumes less power, or is less computationally intensive.

SUMMARY OF THE INVENTION

Briefly, in accordance with one embodiment of the invention, a coarse frequency burst detector for use at the receiving end of a wireline communications system comprises: a digital signal filter adapted to filter a component of decoded signal samples, the decoded signal samples being derived from a baseband signal transmitted via the wireline communications system; and a threshold detector adapted to threshold the signal level of the filtered component of the decoded signal samples with respect to a substantially predetermined level. In accordance with another embodiment, a method of detecting at the receiving end of a wireline communications system a frequency burst in a baseband signal transmitted via the wireline communications system comprises the steps of: filtering a component of a decoded signal derived from the baseband signal transmitted via the wireline communications system; and thresholding the filtered component.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, may best be understood by reference to the following detailed description when read with the accompanying drawings in which:

FIG. 7 is a schematic diagram and FIGS. 8 and 9 are flowcharts illustrating one particular embodiment of a coarse frequency burst detector (CFBD) for a wireline communications system in accordance with the invention.

DETAILED DESCRIPTION

Figure 2:
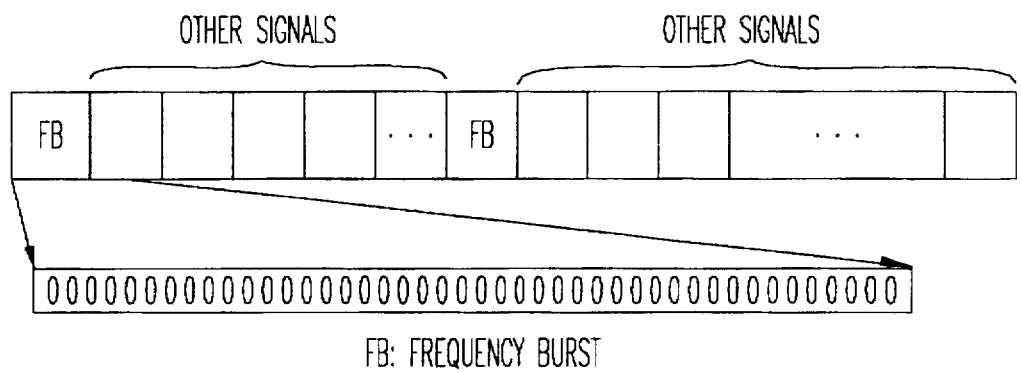
FIG. 2 is a schematic diagram of an embodiment of a frequency burst, such as may be employed by a wireline communications system. The embodiment of a frequency burst illustrated may be detected by a coarse frequency burst detector (CFBD) for a wireline communications system in accordance with the invention.

As previously described, a frequency burst may be employed over a wireline communications system for frequency detection and correction. As shown in FIG. 2, the embodiment of a frequency burst illustrated comprises a frequency correction data burst or frequency burst in the form of a predetermined number of successive "zero" signals. The invention is, of course, not restricted in scope to a frequency burst having this particular signal structure. As one example, alternatively a frequency burst comprising all "ones" may be employed. However, the particular embodiment illustrated produces a substantially constant frequency shift of the carrier frequency that may be employed at the receiving end of the wireless communications system for frequency correction.

One useful form of signal modulation in the baseband is referred to as gaussian minimum phase shift keying (GMSK). GMSK is described in more detail in *Digital Phase Modulation*, by J. B. Anderson, T. Aulin, and C. E. Sundberg, 1986, available from Plenum, and in the aforementioned Borth and Raskey paper, although the invention is not restricted in scope to GMSK or MSK. For example, alternatively an embodiment of a coarse frequency burst detector (CFBD) for a wireline communications system in accordance with the invention may be used in conjunction with a variety of modulation schemes, such as minimum phase shift keying (MSK) or differential quadrature phase shift keying (DSPSK).

In a GSM GMSK specified transmitter, the input binary digital signal or bit stream is differentially encoded and applied to a filter with a gaussian impulse response function and then FM modulated. The gaussian filtered waveform is passed to an FM modulator that produces a positive or negative π/2 radians or 90° phase shift for each NRZ (non-return to zero) signal being transmitted. One advantage of this form of signal modulation is to permit a constant amplitude modulator to be employed and for "spectral efficiency." Thus, nonlinear carrier frequency power amplifiers may be employed at both the transmitting and receiving end of the wireline communications system.

Figure 3:
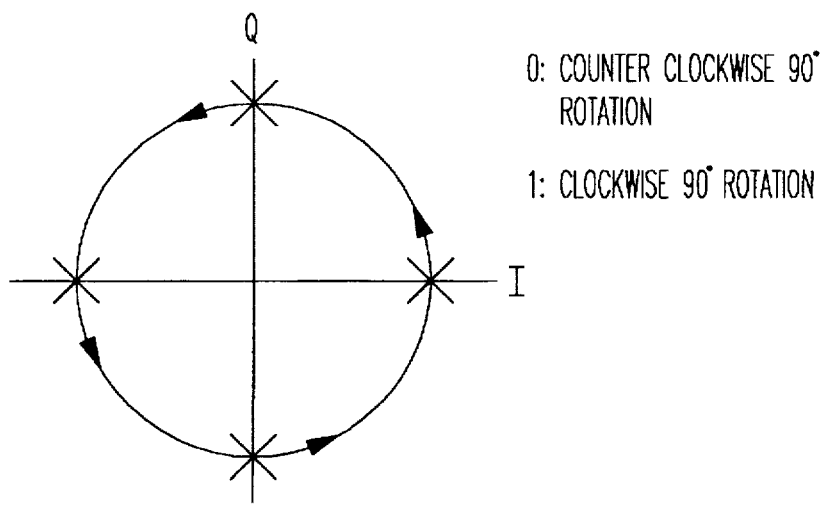
FIG. 3 is a diagram of a "idealized" signal constellation in the Inphase-Quadrature (I-Q) plane for a minimum phase shift keyed (MSK) signal. Such a signal constellation may be representative of a signaling scheme resulting from the use of gaussian minimum phase shift keying (GMSK).

FIG. 3 illustrates an "idealized" signal constellation in the Inphase-Quadrature (I-Q) plane of a frequency burst of "zero" signals that have been encoded in accordance with GSM GMSK specified modulation in the baseband for signal transmission over a wireline signal path or over a wireline communications system. In this context, a wireline communications system refers to a communications system having a transmitting end and a receiving end in which signals are transmitted or communicated from the transmitting end to the receiving end via a wireline signal path. Examples of a wireline signal path include a signal path comprising coaxial cables, twisted pair copper wires, optical fibers (and/or any combinations thereof). At the receiving end of the wireline signal path, after downconversion from the carrier frequency, each differentially encoded bit or binary digital signal value will signal a phase shift in the I-Q plane of +π/2 radians or 90°, as illustrated in FIG. 3. This corresponds to counter clockwise rotation in the I-Q plane for a stream of binary digital signal "zeros" being transmitted. The transmission of a frequency burst of all "ones" corresponds to clockwise rotation. Likewise, this may be viewed as equivalent to shifting the frequency of the carrier signal employed to transmit the baseband signal over the wireline signal path by a value of +B/4 when a frequency burst of all "zeros" is transmitted and -B/4 when a frequency burst of all "ones" is transmitted, where B is the bit rate of the transmitted digital signal stream. At the receiving end, after downconversion, the transmitted signal may be recovered by "derotating" the baseband signal and then passing it through a minimum least squares error (MLSE) equalizer. More particularly, regarding "derotation," a clockwise rotation of 90° may be applied to each encoded digital signal sample transmitted via the wireline signal path. This may also be viewed as equivalent to signal multiplication of the baseband signal in the time domain by $$e^{-\frac{j\pi}{2}k},$$

where k=0,1,2,3, . . . . . It will, of course, be appreciated that the scope of the invention is not restricted to a particular direction for rotation or derotation. This will depend, at least in part, on the particular signaling scheme employed.

At the receiving end, one may locate or acquire a carrier signal by searching a physical channel for a frequency burst. One difficulty associated with such an approach, however, is that it requires significant computational resources to detect the frequency burst with state-of-the-art approachs. For example, exhaustive matched filtering may be employed. This becomes particularly problematic in an environment with limited computational resources, such as, for example, during peak signal loading of a receiver which may occur during signal transmission or signal reception.

Figure 1:
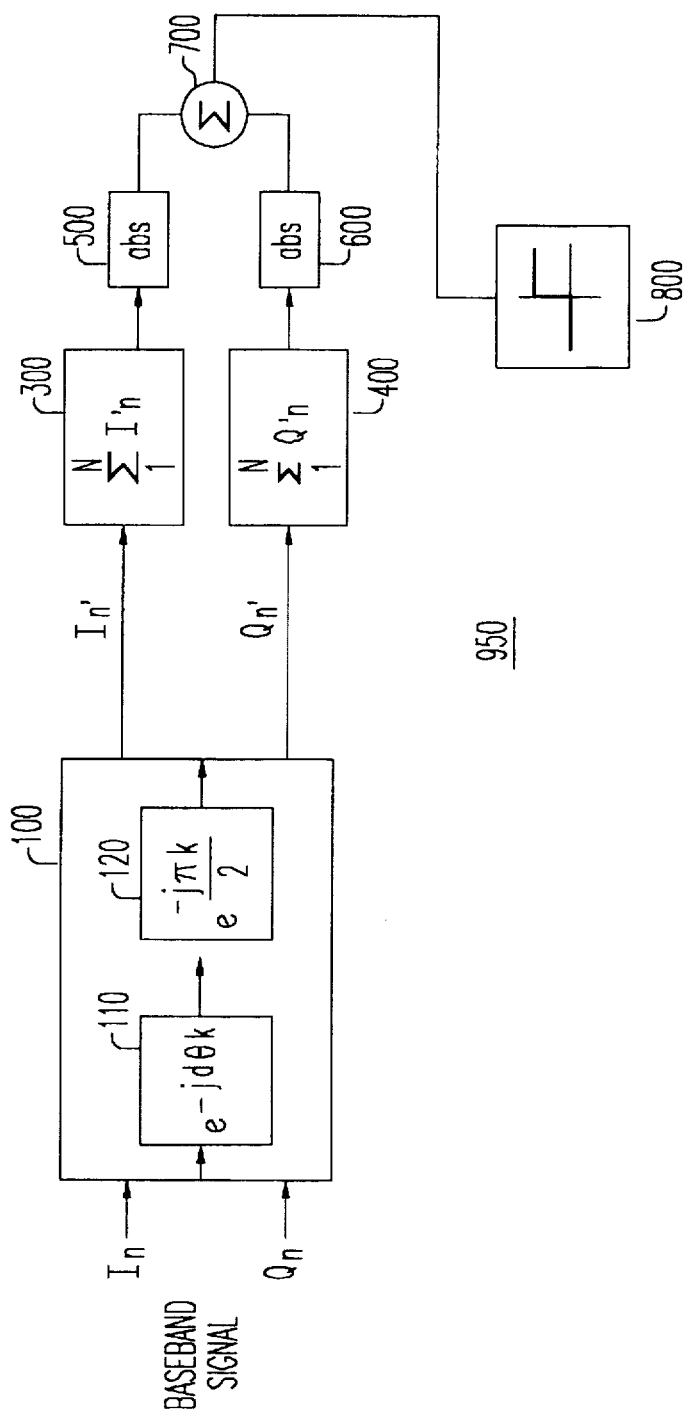
FIG. 1 is a schematic diagram of an embodiment of a coarse frequency burst detector (CFBD) for a wireline communications system in accordance with the invention.

A coarse frequency burst detector (CFBD) for a wireline communications system in accordance with the invention may be employed to detect at the receiving end of the wireline communications system a frequency burst, such as in a baseband signal, e.g., the transmitted signal after reception and downconversion, without performing exhaustive matched filtering. FIG. 1 is a block diagram of one embodiment 950 of a coarse frequency burst detector (CFBD) for a wireline communications system in accordance with the invention. At the receiving end, the transmitted signal, such as a carrier signal impressed with a signal encoded in the baseband in accordance with GMSK, is first downconverted. Downconversion of a signal, such as by a receiver, is well-known and need not be described in this context. After downconversion, the signal is provided in the form of a baseband signal. Typically, once the transmitted signal has been downconverted, this downconverted signal may be digitized by a baseband CODEC. An example of a downconverter and CODEC to perform such A/D conversion includes the W2020 GSM Transceiver and CSP1088 GSM Conversion Signal Processor, both available from AT&T Corp., although the scope of the invention is not limited in this respect. Furthermore, the invention is not limited in scope to an embodiment in which A/D conversion is performed so that digital signal processing may be employed. Alternatively, a coarse frequency burst detector for a wireline communications system in accordance with the invention may perform signal processing without A/D conversion, i.e., in the analog domain. Likewise, the invention is not restricted in scope to performing A/D conversion at this particular point in the signal path. For example, A/D conversion may be performed earlier in the signal path, such as before removal of the carrier frequency, or later in the signal path, depending on the particular embodiment.

As illustrated by the block diagram of FIG. 1, in a CFBD for a wireline communications system in accordance with the invention, the baseband signal samples, obtained after A/D conversion, may then be adjusted in phase, although the invention is not restricted in scope in this respect. Phase adjustment of the baseband signal samples is illustrated in FIG. 1 by phase shifter or modifier 100; however, in alternative embodiments phase shifter 100 may be omitted, as explained in more detail hereinafter. Derotator 120 of phase shifter 100 provides a phase shift of -90° or -π/2 radians to the baseband signal samples. As previously described, this is referred to as "derotation." This derotation may be accomplished by signal multiplication in the time domain of the baseband signal samples with $$e^{-\frac{j\pi}{2}k},$$

where k=0, 1, 2, 3, . . . . . The precise nature of executing the derotation will depend at least in part on the environment and nature of the signal that is to be derotated.

Thus, in this particular embodiment, the baseband signal has been converted to discrete signal samples, denoted in FIG. 1 as $I_n$ for the inphase component and $Q_n$ of the quadrature component of a particular $n^{th}$ discrete signal sample, and derotation is applied to these baseband signal samples in this form, as illustrated in FIG. 1, for example. In this context, the signal samples are also referred to as decoded because processing of the baseband signal samples by derotation has effectively removed the GMSK modulation applied to the signal in the baseband in the particular embodiment before transmission over the wireline signal path.

As illustrated in FIG. 1, phase shifter 100 further includes phase compensation performed by phase compensator 110. Phase compensation may also be applied to the baseband signal after A/D conversion, as previously described. For example, an estimate of the oscillator frequency offset error, denoted dθ in FIG. 1, may be obtained such as described in aforementioned concurrently filed patent application Ser. No. 08/357,802 (Mobin 17), and the estimate may be used to perform phase compensation, although a CFBD for a wireline communications system in accordance with the invention is not restricted in scope in this respect. Furthermore, as explained in more detail hereinafter, phase compensation and derotation may be applied to each baseband signal sample at the same time. Again, a number of different techniques to perform phase compensation or derotation in this context may be employed.

Figure 4:
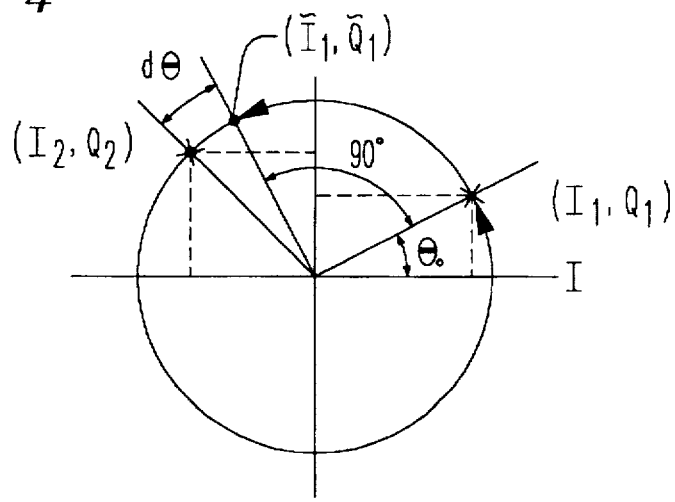
FIGS. 4, 5 and 6 are diagrams of signal samples in the Inphase-Quadrature (I-Q) plane to illustrate various aspects of the operation of an embodiment of a coarse frequency burst detector (CFBD) for a wireline communications system in accordance with the invention.

FIG. 4 is a diagram illustrating the problem addressed by phase compensator 110, where the embodiment of a CFBD for a wireline communications system includes a phase compensator. As illustrated, a first baseband signal sample, such as a "zero" signal in GMSK, denoted as $(I_1,Q_1)$ in rectangular coordinates in FIG. 4, may be obtained. As illustrated, this baseband signal sample may include an initial phase error offset of $\theta_o$ attributable to, for example, signal processing errors or such as may be due to the delay between the transmitter and receiver or due to an offset associated with the selection of a "sampling instant." Assuming the next baseband signal sample is also a zero signal, as for the embodiment of a frequency burst illustrated in FIG. 2, the next baseband signal sample may comprise $(I_2,Q_2)$, again represented in rectangular coordinates. As illustrated, although ideally $(I_2,Q_2)$ should be oriented with respect to $(I_1,Q_1)$ by ½ radians or 90° for GMSK as illustrated by $(\tilde{I}_1,\tilde{Q}_1)$, due to a potential oscillator frequency offset error, such as may be introduced by the oscillator employed to perform the downconversion, for example, a phase error, denoted dθ in FIG. 4, may result. Thus, phase compensator 110 provides phase compensation to a baseband signal sample to compensate for, e.g., reduce or remove, the error in the baseband signal sample due to this phase error, dθ, attributable to the oscillator frequency offset error. Phase shifter 100 thus produces phase adjusted baseband signal samples, or phase compensated, derotated baseband signal samples. These decoded signal samples produced by phase shifter or modifier 100 are illustrated in FIG. 1 as comprising inphase and quadrature components $I'_n$ and $Q'_n$, respectively. Although an embodiment of a CFBD in accordance with the invention may include a phase shifter, such as previously described, the invention is not restricted in scope in this respect. For example, alternatively the decoded signal samples may be directly provided to a CFBD for a wireline communications system in accordance with the invention. In this situation, the baseband signal samples may be decoded by a separate process or signal processor. For example, if the baseband signal samples has already been processed by an oscillator frequency offset error estimator, such as described in copending patent application Ser. No. 08/357,802 (Mobin 17), decoded signal samples from which an estimate of the accumulated oscillator frequency offset error has already been removed may then be provided. Likewise, in some situations, satisfactory results may be obtained using a CFBD for a wireline communications system in accordance with the invention without employing phase compensation for the oscillator frequency offset error.

As previously described, after downconversion of the signal transmitted via the wireline signal path, the baseband signal obtained may be converted to binary digital signal samples. Although the I and Q components of a signal sample may be employed to represent the signal sample values, of course, decomposition of the signal samples into signal components other than I and Q may also provide satisfactory performance under the appropriate circumstances. In this particular embodiment, the I and Q components of the signal samples are filtered by moving average (MA) filters 300 and 400 to respectively provide a moving average of the I components and a moving average of the Q components for the signal samples. Although not illustrated in FIG. 1, as explained in more detail hereinafter, the "window size" associated with these filters, designated N in FIG. 1, may be modified. For example, the window size may be modified adaptively.

Although in FIG. 1 schematically these filters are illustrated as two separate filters, alternatively one filter may be employed. In such an embodiment, first one of the orthogonal components, such as the I component, may be filtered and then the other component, such as the Q component, may be filtered. Of course, it may be necessary in these circumstances to store signal sample values so that the orthogonal components may be separately filtered or processed. The respective magnitudes of the filtered I and Q components for the decoded signal samples is then determined in this embodiment, such as by absolute magnitude detectors 500 and 600. The respective magnitudes of the filtered orthogonal components are then constructively superpositioned or combined by accumulator 700 and provided to signal threshold detector 800.

It will, of course, be appreciated that the magnitude of the filtered orthogonal components of the decoded signal samples may be detected by other techniques. For example, the filtered orthogonal components may be squared. Likewise, in alternative embodiments, it may be unnecessary to detect the magnitude so that the filtered orthogonal components may be constructively combined. Depending on the particular signaling scheme, for example, the filtered orthogonal components may already be produced in a form so that the filtered orthogonal components sum or combine constructively. Likewise, in some circumstances, it may prove satisfactory to detect a frequency burst by filtering only a component of the decoded signal samples. For these embodiments, constructively combining magnitudes is not a concern.

Detection of the frequency burst for a CFBD for a wireline communications system in accordance with the invention will depend on whether a predetermined signal threshold or signal level is reached or achieved. Of course, the particular signal level will depend on the particular embodiment. For example, in embodiments utilizing only a component, the signal level may be negative and "exceeding" the threshold may involve a "more negative" signal value. As previously indicated, it will, of course, be appreciated that the scope of a CFBD for a wireline communications system in accordance with the invention is not limited to use in conjunction with respect to GMSK. A CFBD in accordance with the invention may be employed in any wireline communications system employing a frequency burst signal.

Figure 5:
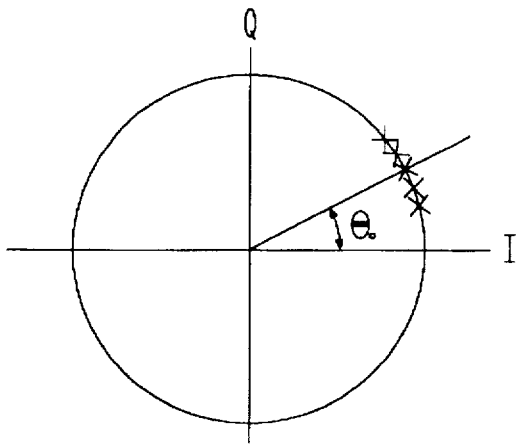

Advantages of the approach previously described may be illustrated by considering, for example, the embodiment of a frequency burst illustrated in FIG. 2 in conjunction with the type of signal modulation employed in GMSK; although, as previously described, the invention is not restricted in scope in this respect. As previously described, this frequency burst embodiment comprises a predetermined series of successive zero signals. Likewise, GMSK, as previously described, provides encoding so that a differential bit value of zero may be transmitted at least in part by a phase change of +90° or ½ radians. Therefore, by phase compensating and derotating the baseband signal samples, as shown by the embodiment illustrated in FIG. 1, reception of a series of differential bit values of zero, such as for a frequency burst, should produce a relatively large threshold at the threshold detector of a CFBD for a wireline communications system in accordance with the invention, taking into account potential error attributable to, for example, signal noise. This is illustrated in FIG. 5 in which decoded signal samples cluster in the first quadrant.

Figure 6:
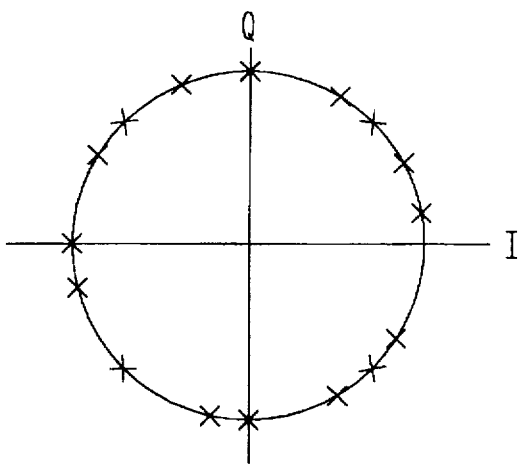

However, if, in contrast, another transmitted signal other than the frequency burst is sensed, the threshold detector should detect a different, smaller threshold using a CFBD for a wireline communications system in accordance with the invention. This is illustrated in FIG. 6 in which the decoded signal samples are distributed around the unit circuit in the I-Q plane. Thus, for these signal samples, when the orthogonal components of the signal samples, such as the I components and Q components, are separately filtered, such as illustrated by the embodiment in FIG. 1, a smaller magnitude will result for each filtered component. By selecting an appropriate threshold or signal level, the threshold detector may therefore detect the presence of a frequency burst, as opposed to other signals that may be transmitted over the wireline.

A CFBD for a wireline communications system in accordance with the invention, such as the embodiment illustrated in FIG. 1 and previously described, provides a number of advantages. The hardware complexity of such a detector is relatively low in comparison with a digital signal processor or other co-processor that may typically be employed to alternatively perform matched filtering. Of course, one alternative embodiment of a CFBD for a wireline communications system in accordance with the invention may comprise a DSP programmed to digitally perform, for example, signal filtering and amplitude detection as previously described. Likewise, as a result, relatively less power is dissipated by an approach in accordance with the present invention in comparison with prior art approachs. Utilizing a CFBD for a wireline communications system in accordance with the invention may also provide advantages during peak loading periods at the receiving end of the wireline signal path. A CFBD for a wireline communications system in accordance with the invention may be employed, for example, so that the relatively limited computational resources at the receiving end may be applied to perform other signal processing operations, such as speech encoding/decoding, channel encoding/decoding, voice recognition, etc.

Although an approach in accordance with the invention may be employed in a number of different aspects of a wireline communications system, in one embodiment, such as a receiver including a CFBD in accordance with the invention, the CFBD may be employed to detect the presence of a frequency burst. Thus, in one embodiment, a CFBD for a wireline communications system in accordance with the invention may be employed for the coarse detection of the frequency burst and a correlator detector, such as may be realized with a DSP, for example, may be employed to further confirm the presence of other predetermined signal schemes, if transmitted. Likewise, upon detection of a tentative frequency burst, a CFBD for a wireline communications system in accordance with the invention may then invoke an "interrupt" to a digital signal processor or other co-processor that may then initiate "fine" frequency burst detection, for example. By this technique, significant computational resources of the receiver may be conserved for other signal processing tasks.

Figure 7:
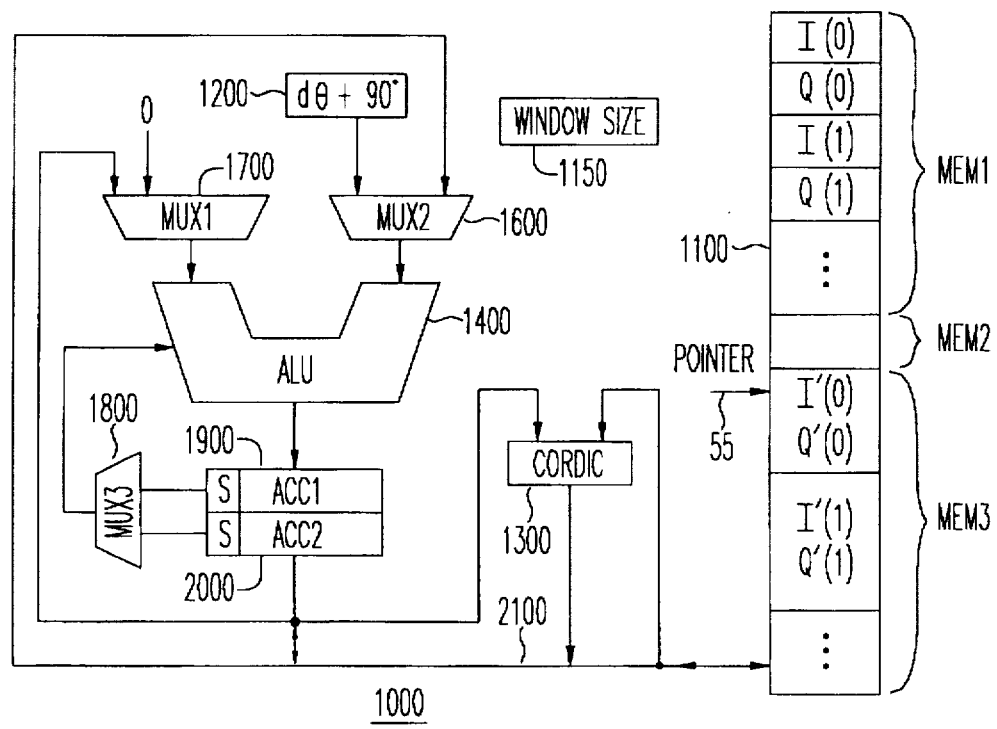

FIG. 7 illustrates a vector processor or co-processor 1000 for implementing an embodiment of a CFBD for a wireline communications system in accordance with the invention. Such a vector co-processor may be employed to implement an embodiment of a CFBD for a wireline communications system in accordance with the invention using digital signal processing; however, as will now be appreciated by those of ordinary skill in the art, alternative vector co-processors for implementing a CFBD for a wireline communications system in accordance with the invention are possible and the invention is not restricted in scope to this particular vector co-processor. Furthermore, alternative embodiments may process signals other than binary digital signals to perform detection of the frequency burst.

Vector co-processor 1000 illustrated in FIG. 7 incudes a memory cache or RAM 1100, a CORDIC processor 1300 and an arithmetic logic unit (ALU) 1400. CORDIC processors are well-known in the art, such as described in, for example, "The CORDIC Trigonometric Computing Technique," by J. E. Volde, appearing in IRE Transactions on Electronic Computers, September 1959, and "CORDIC Based VLSI Architectures for Digital Signal Processing," by Yu Hen Hu, appearing in IEEE Signal Processing Magazine, July, 1992, both of which are herein incorporated by reference. As illustrated in FIG. 7, memory cache 1100, CORDIC processor 1300 and ALU 1400 are coupled by a signal bus 2100 capable of transmitting, for example, sixteen bit words, although the scope of the invention is not limited in this respect. Vector co-processor 1000 further includes register 1150, register 1200, multiplexers (MUXs) 1600 and 1700, registers 1900 and 2000, and multiplexer (MUX) 1800, coupled as illustrated in FIG. 7.

Figure 8:
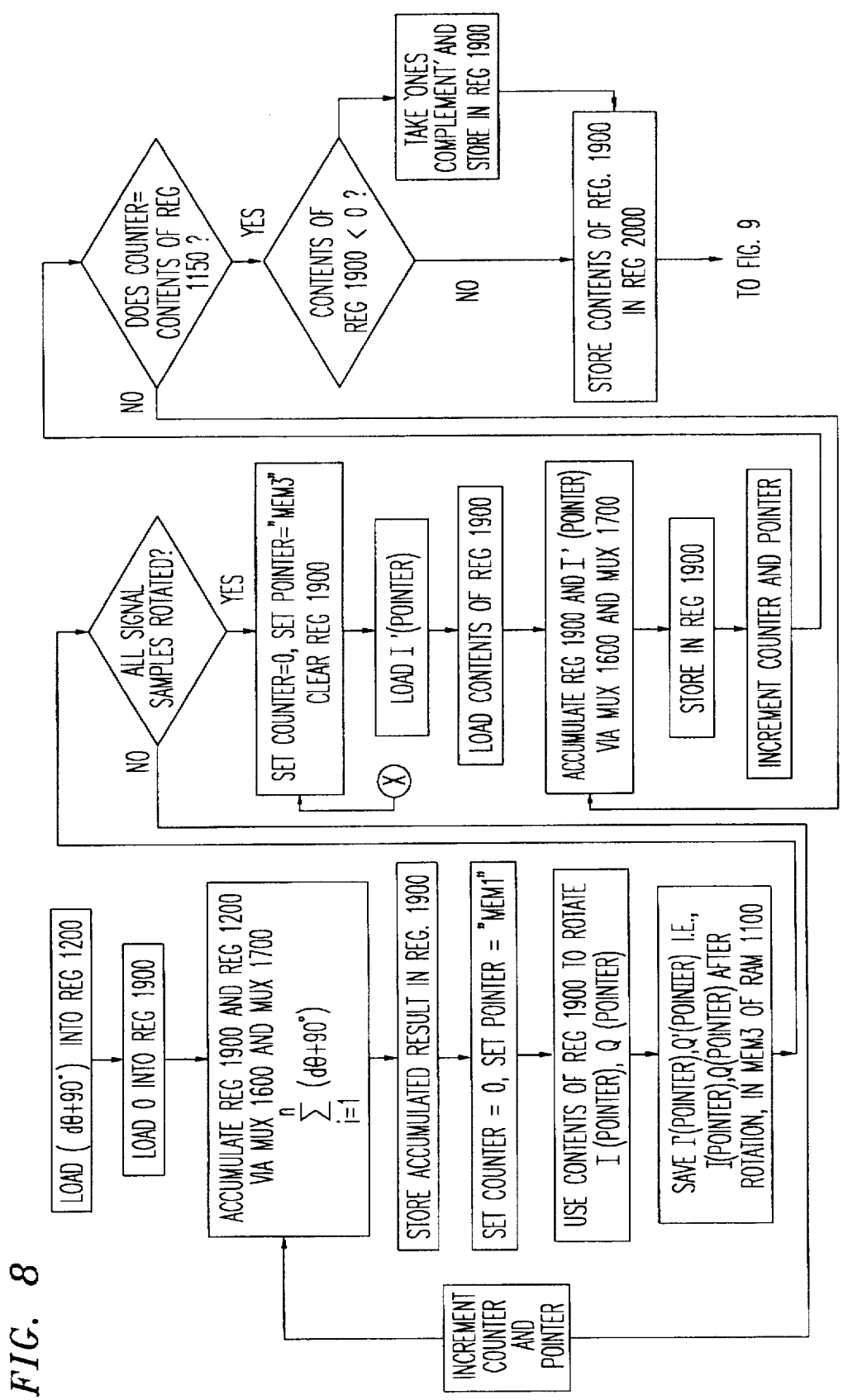

The operation of vector co-processor 1000 to implement an embodiment of a CFBD for a wireline communications system in accordance with the invention is now explained and illustrated by the flowchart shown in FIG. 8. As illustrated by the flowchart, first a digital signal value (dθ plus 90°) may be loaded into register 1200.

In this particular embodiment, this signal value represents the phase compensation or phase offset to be applied to a baseband signal sample, as previously described, including a derotation of 90°. The signal value loaded into register 1200 may be accumulated by ALU 1400, via MUX 1600 and MUX 1700, and this result may be stored in register 1900. This accumulated angle stored in register 1900 may now be used to adjust the phase of a first baseband signal sample, denoted I(o), Q(o) in RAM 1100 of FIG. 7 in this context. The first baseband signal sample may be provided to CORDIC processor 1300 via signal bus 2100 from RAM or memory cache 1100, where all of the baseband signal samples may be stored, such as in memory portion "mem 1," after A/D conversion for this particular embodiment. Likewise, register 1900 is coupled to CORDIC processor 1300 so as to provide as a signal the amount of rotation for CORDIC processor 1300 to apply to the baseband signal sample obtained from RAM 1100. The signal sample resulting from processing applied by CORDIC processor 1300 to the baseband signal sample may then be provided to signal bus 2100 so that it may ultimately be stored in RAM 1100. In FIG. 7, this digital signal value is denoted I'(o), Q'(o) and stored in memory portion "mem 3." The flowchart shown in FIG. 8, of course, omits details regarding the exact memory locations in which signal samples are stored and is merely for purposes of illustration. As further illustrated by the flowchart shown in FIG. 8, in this embodiment this process may alternatively be continued until all of the baseband signal samples have been adjusted in phase. To accomplish this, the result of the previous accumulation stored in register 1900 is now provided to ALU 1400 via MUX 1700, whereas the digital signal value, (dθ plus 90°), is again provided to ALU 1400 via register 1200 and MUX 1600 so that the amount of phase adjustment to be applied to I(1), Q(1), for example, is twice the estimated phase offset, dθ, plus a derotation of 180°. Of course, as previously described, the baseband signal samples may alternatively be decoded by an entirely separate process or processor and the decoded signal samples may be directly provided for alternative embodiments of a CFBD for a wireline communications system in accordance with the invention.

Once the decoded signal samples are obtained, the orthogonal components of the resulting decoded signal samples may be filtered. This may be accomplished using the architecture shown in FIG. 7 as follows. Depending on the particular embodiment, a counter (not shown) may be set to zero and a pointer, such as pointer 55 illustrated in FIG. 7, may be set to the first address in RAM 1100 containing the decoded signal samples, such as "mem 3." Via signal bus 2100 and MUX 1600, the components of the signal samples may be provided to ALU 1400.

Likewise, via MUX 1700, the current contents of register 1900 may be provided to ALU 1400 to perform recursive or iterative processing. For example, for filtering of the I component of the first decoded signal sample, register 1900 may be set to zero.

Thus, in this embodiment, the I component of the decoded signal samples may first be accumulated using ALU 1400. This may be accomplished by continually incrementing the counter and the pointer so as to indicate the next memory address in RAM 1100 that contains the next inphase component. Typically, this may involve incrementing the pointer by two assuming the decoded signal samples are successively stored with the inphase and quadrature components of each signal sample being stored in adjacent memory locations, although the invention is not restricted in scope to these implementation details. Likewise, register 1100 may contain a "window size" that may be adjusted depending upon the particular embodiment. Thus, the counter may be incremented until the counter reaches the window size. Considerations related to the selection of the window size will be described in more detail hereinafter. By executing the loop previously described, once the counter reaches the window size in this particular embodiment, register 1900 should contain the sum of all the inphase components of the decoded signal samples in the "window." It will, of course, be appreciated that alternative filters, other than simply a moving average filter of the inphase components of the decoded signal samples such as a low-pass filter, may be implemented using ALU 1400.

Once the inphase components of the decoded signal samples have been filtered, such as previously described, then, as illustrated in FIG. 7, the magnitude of this filtered component of the decoded signal samples may be determined. In FIG. 7, this is illustrated by MUX 1800 in which the sign bit of register 1900, denoted S in FIG. 7, is provided to ALU 1400. If the filtered inphase component of the decoded signal samples is negative, as indicated by the sign bit of the signal value stored in register 1900, then the signal value stored in register 1900 is fed back via MUX 1700 to ALU 1400 so that the "ones complement" of that signal value may be determined and stored in register 2000. Alternatively, if the magnitude of the signal value is not negative then that signal value may be stored in register 2000 without taking the "ones complement." As illustrated in FIG. 9, once the magnitude of the filtered inphase component of the decoded signal samples is determined, the same process may be repeated for the quadrature component of the decoded signal samples. Thus, the quadrature components may be filtered by ALU 1400 and the magnitude detected, as previously described. As illustrated in FIG. 9, once this process is complete, the signal value contained in register 1900, which contains the "absolute" filtered magnitude of the quadrature component of the decoded signal samples, may be summed or constructively combined with the signal value contained in register 2000, which contains the "absolute" magnitude of the filtered inphase component of the decoded signal samples. Finally, a threshold value or signal level may be loaded into register 1200 and provided to ALU 1400 via MUX 1600, whereas the superposition or accumulation of the magnitudes of the filtered orthogonal components of the decoded signal samples may be provided to the ALU 1400 via MUX 1700. As previously discussed, in alternative embodiments it may be sufficient to filter only one component of the decoded signal samples. Thus, for these embodiments, it may not be required to detect the magnitude of the filtered orthogonal component because constructively combining magnitudes is not contemplated. Likewise, for convenience, depending on the particular embodiment, threshold detection may comprise comparing the filtered component to a negative digital signal value or level, such as with ALU 1400.

After thresholding, if the threshold is met, then, as illustrated in FIG. 9, an interrupt is initiated, such as to an additional processor so that, for example, a fine correlation may begin. In this context, meeting or exceeding the threshold refers to having a magnitude exceeding the magnitude of the threshold signal level; however, this may conveniently be implemented with negative signals as well as positive signals, as previously indicated, depending on the particular embodiment. Alternatively, if the threshold is not achieved, then the pointer, as previously described may be incremented so that the next successive "window" of decoded signal samples may be filtered, as illustrated in FIGS. 8 and 9.

In an embodiment employing a "window," as previously described, one convenient approach, to save computation time and power utilization when performing computations for the next window of signal samples, may involve simply adding a component for the next signal sample to the previously stored sum of signal sample components, such as either the I component or Q component depending, of course, on the particular sum and the particular embodiment, and subtracting from the stored sum the "oldest" or first signal sample component from the sum. Thus, the value for the next window may thereby be obtained without repetitively summing intermediate signal sample component values.

Another aspect of CFBD for a wireline communications system in accordance with the invention relates to the selection of the "window size." As indicated previously, window size relates to the filtering of the orthogonal components of the decoded signal samples. Although the invention is not restricted in scope to a particular window size, nonetheless, the selection of the window size may involve a trade-off between various considerations. For example, if a relatively larger or long signal sample "window" is employed, such as near the expected signal sample length of the frequency burst, the signal level for detection may be set relatively high. This should reduce the potential for false frequency burst detections; however, it may also increase the likelihood of failing to detect a frequency burst with good boundary conditions when a frequency burst is present. Alternatively, the window size may be chosen to be relatively small. This should reduce the likelihood of failing to detect a frequency burst, but may also increase the likelihood of a false detection.

Another aspect relating to window size concerns phase compensation. As illustrated in FIG. 4, and discussed in more detail previously, it may be desirable to provide phase compensation in an embodiment of a CFBD for a wireline communications system in accordance with the invention, although the invention is not restricted in scope in this respect. However, for those embodiments in which phase compensation is not provided, it may be desirable to initially employ a relatively smaller window size to filter the orthogonal components of the decoded signal samples. In such an embodiment, an uncompensated oscillator frequency offset error may adversely affect the desired clustering of the decoded signal samples in the I-Q plane, as illustrated in FIG. 5, and, thus, at least slightly degrade the performance of an embodiment of a CFBD for a wireline communications system in accordance with the invention. More specifically, the decoded signal samples are less likely to cluster and more likely to be mutually spaced along the perimeter of a unit circle in the I-Q plane due to the presence of oscillator frequency offset error. If the oscillator frequency offset error accumulates significantly, the decoded signal samples may cross the I or Q axis which may affect one of the filtered orthogonal components in actual operation. Using a smaller window size, however, should increase the likelihood of a detection for smaller signal levels, even in the presence of accumulation of an uncompensated oscillator frequency offset error. Thus, satisfactory performance should nonetheless result.

Figure 10:
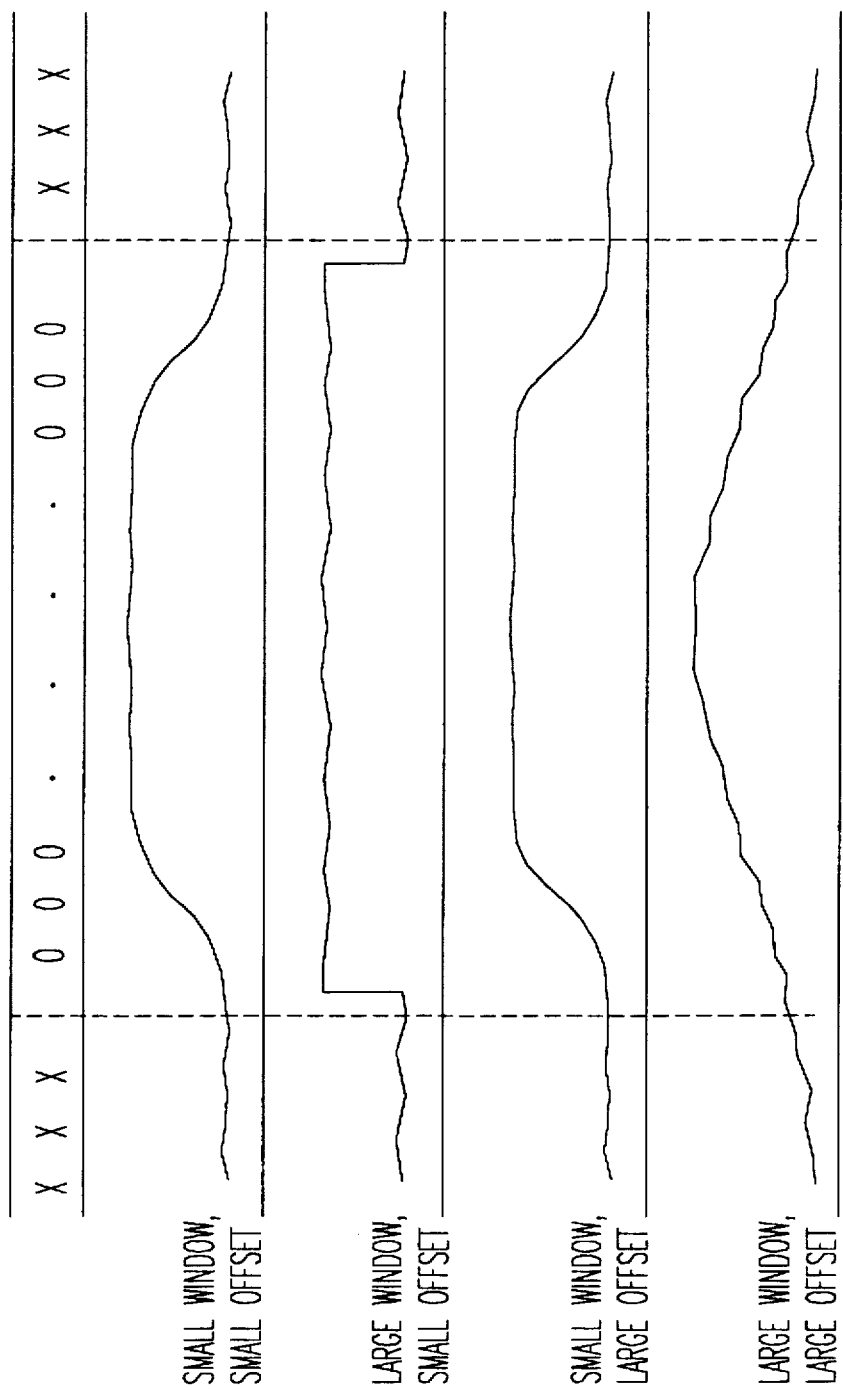
FIG. 10 is a diagram illustrating the potential effect of variations in window size and phase or frequency offset error on the results obtained by an embodiment of a coarse frequency burst detector (CFBD) for a wireline communications system in accordance with the invention.

In yet another alternative embodiment of a CFBD for a wireline communications system in accordance with the invention, an adaptive window size may, likewise, be employed. In such an embodiment, a relatively small window size, such as previously described, may first be employed for frequency burst detection. Once the frequency burst is tentatively identified, the oscillator frequency or phase offset error may be estimated based on the detected burst. This may be accomplished, for example, in accordance with an oscillator frequency offset error estimator for a wireline communications system, as described in concurrently filed patent application Ser. No. 08/357,802 (Mobin 17), although the present invention is not restricted in scope in this respect. Nonetheless, once the phase or frequency offset error is estimated by an available technique, the signal samples may be corrected or phase compensated and a relatively larger window size may be employed to then confirm the presence of the frequency burst. If the frequency burst is confirmed, further signal processing may then occur. One advantage of this approach may be associated with the observation that for situations in which a relatively large phase or frequency offset error is present, a relatively smaller window size may provide better frequency burst detection results for an embodiment of a CFBD for a wireline communications system in accordance with the invention, than a relatively larger window size. However, as previously indicated, the rate of false detections may also increase with a relatively smaller window. On the other hand, where the phase or frequency offset is extremely small, a larger window may provide better frequency burst detection results. This is shown in FIG. 10 in which the potential frequency burst detection results for possible alternatives with respect to window size and phase or frequency offset are illustrated. The adaptive approach previously described employs the beneficial aspects of alternatively sized windows to detect the frequency burst.

It will now be appreciated that an embodiment of a CFBD for a wireline communications system in accordance with the invention has been illustrated, as previously described, in which, in succession, the baseband signal samples are adjusted in phase, the inphase component of the decoded signal samples is filtered and its magnitude is detected, the quadrature component of the decoded signal samples is filtered and its magnitude is detected, and the two magnitudes are constructively combined and thresholded, although the invention is not restricted in scope to this particular embodiment. For example, this particular sequence of operations is chosen in order to exploit efficiencies associated with the architecture illustrated in FIG. 7. Thus, many alternative architectures and many alternative sequences of operations may be employed. For example, phase adjustment may be applied a single baseband signal sample at a time and the filtering may be applied a single decoded signal sample at a time, e.g., iteratively rather than applying the phase adjustment to all of the baseband signal samples before beginning the filtering of the decoded signal samples. Likewise, filtering of the inphase components and the quadrature components may be completed before detecting the magnitude of those filtered components, as opposed to the approach previously described. Furthermore, as previously discussed, in alternative embodiments, only one component may be filtered or, instead of processing baseband signal samples, decoded signal samples may be provided directly. It is therefore intended to include within the scope of the appended claims all such alternative approachs.

A method of detecting a frequency burst in a baseband signal transmitted via a wireline communications system may be accomplished in the following manner. The frequency burst is detected at the receiving end of the wireline communications system. The baseband signal transmitted via the wireline communications system may be processed to obtain a decoded signal. Typically, this may be accomplished by converting the baseband signal to baseband signal samples, such as with A/D conversion, and then adjusting the phase of the baseband signal samples, although the scope of the invention is not restricted in this respect. For example, as illustrated in FIG. 7, a CORDIC processor may be employed to implement the phase adjustment. This produces decoded signal samples, although as previously indicated, the phase adjustment may be omitted in alternative embodiments. Likewise, depending on the particular embodiment, the phase adjustment may include derotation or phase compensation, as previously described. One component or orthogonal components of the decoded signal samples derived from the baseband signal may then be filtered, such as moving average filtered, depending on the particular embodiment. In an embodiment in which discrete signal samples are not produced, one component or both orthogonal components of the decoded signal may be filtered. Typically, inphase components and the quadrature components are separately filtered. The magnitude of the filtered orthogonal components of the may be detected. This may be performed a variety of ways so as to facilitate constructively combining the magnitudes of the filtered orthogonal components. However, in alternative embodiments in which one component is filtered, this step may be omitted. The combined magnitudes are thresholded to determine whether a frequency burst has been detected. However, in alternative embodiments in which one component is filtered, the filtered component may be thresholded directly.

While only certain features of the invention have been illustrated and described herein, many modifications, substitutions, changes or equivalents will now occur to those skilled in the art. It is, therefore, to be understood that the appended claims are intended to cover all such modifications and changes as fall within the true spirit of the invention.

I claim:

1. A method of detecting at the receiving end of a wireline communications system a frequency correction burst in a baseband signal transmitted via the wireline communications system, the frequency correction burst comprising a plurality of digital samples of a same binary value;

said method comprising the steps of:
separately filtering orthogonal components of decoded signal samples derived from the baseband signal transmitted via the wireline communications system;
constructively combining the magnitudes of the separately filtered orthogonal components; and
thresholding the constructively combined magnitudes to detect the frequency correction burst.

2. The method of claim 1,
and further comprising, prior to the filtering step, the step of:
deriving the decoded signal samples from the baseband signal transmitted via the wireline communications system.

3. The method of claim 2,
wherein the deriving step comprises the steps of:
converting the baseband signal to baseband signal samples; and
adjusting the phase of the baseband signal samples.

4. The method of claim 3,
wherein the step of adjusting the phase comprises the steps of:
phase compensating the baseband signal samples; and
derotating the baseband signal samples.

5. The method of claim 3,
wherein the step of adjusting the phase comprises derotating the baseband signal samples.

6. The method of claim 1,
wherein the step of separately filtering orthogonal components of decoded signal samples comprises separately filtering the inphase components and the quadrature components of the decoded signal samples.

7. The method of claim 6,
wherein the step of separately filtering the inphase components and the quadrature components comprises separately moving average filtering the inphase components and the quadrature components.

8. The method of claim 1,
wherein the step of constructively combining the magnitudes of the separately filtered orthogonal components comprises:
detecting the sign of each of the separately filtered orthogonal components;
complementing any negative filtered orthogonal component so as to obtain its magnitude; and
combining the magnitudes of the separately filtered orthogonal components.

9. A method of detecting at the receiving end of a wireline communications system a frequency correction burst in a baseband signal transmitted via the wireline communications system, the frequency correction burst comprising a plurality of digital samples of a same binary value;

said method comprising the steps of:
separately filtering orthogonal components of a decoded signal derived from the baseband signal transmitted via the wireline communications system;
constructively combining the magnitudes of the separately filtered orthogonal components; and
thresholding the constructively combined magnitudes to detect the frequency correction burst.

* * * * *